United States Patent

[11] 3,542,205

| [72] | Inventor | Theodore H. O'Cheskey<br>Whittier, California |
|---|---|---|
| [21] | Appl. No. | 793,126 |
| [22] | Filed | Jan. 22, 1969 |
| [45] | Patented | Nov. 24, 1970 |
| [73] | Assignee | United States Filter Corporation<br>Whittier, California<br>a corporation of California |

[54] FILTER LEAF
12 Claims, 6 Drawing Figs.

[52] U.S. Cl. .................................................. 210/331,
210/347, 210/486
[51] Int. Cl. .................................................. B01d 33/26
[50] Field of Search .......................................... 210/331,
486, 346, 347, 321

[56] References Cited
UNITED STATES PATENTS
2,374,953  5/1945  Pickard ..................  210/347

| 2,472,012 | 5/1949 | Hanneman .................. | 210/486X |
| 2,799,397 | 7/1957 | Berline ......................... | 210/331 |
| 3,450,267 | 6/1969 | Jarvis .......................... | 210/321 |

FOREIGN PATENTS

| 617,677 | 2/1949 | Great Britain ................ | 210/331 |

Primary Examiner—Reuben Friedman
Assistant Examiner—Frank A. Spear, Jr.
Attorney—Christie, Parker & Hale ABSTRACT: An improved filter leaf for an apparatus used in the pressure filtration of liquids wherein a plurality of filter leaves are mounted in adjacent vertical planes on a hollow shaft within a closed drum or filtration tank. The filter leaves comprise a solid fiberglass backing plate, a porous drainage member covering each side of the backing plate, a filtering cloth covering each drainage member and means for sealing the filtering cloth to the periphery of the backing plate.

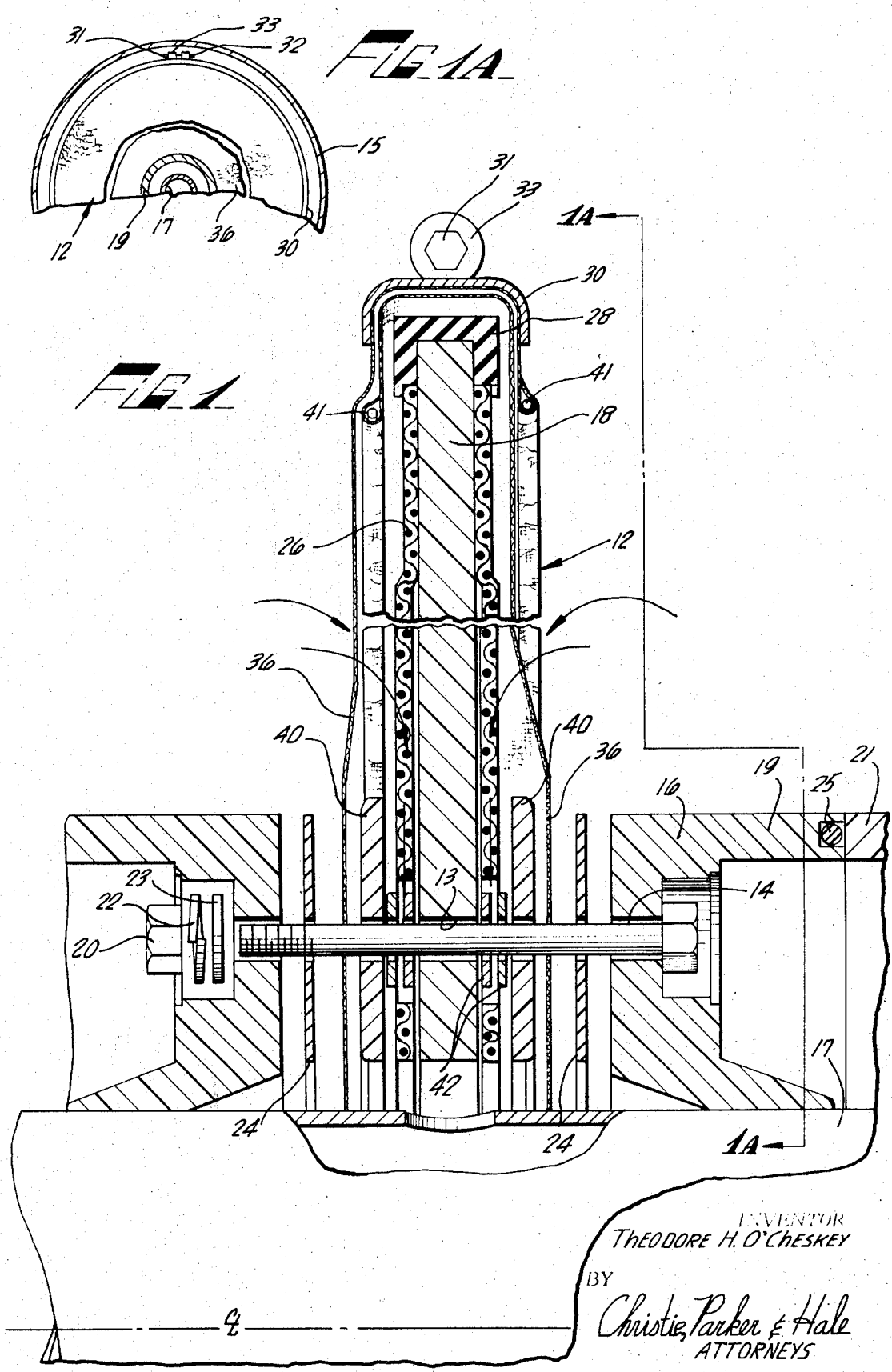

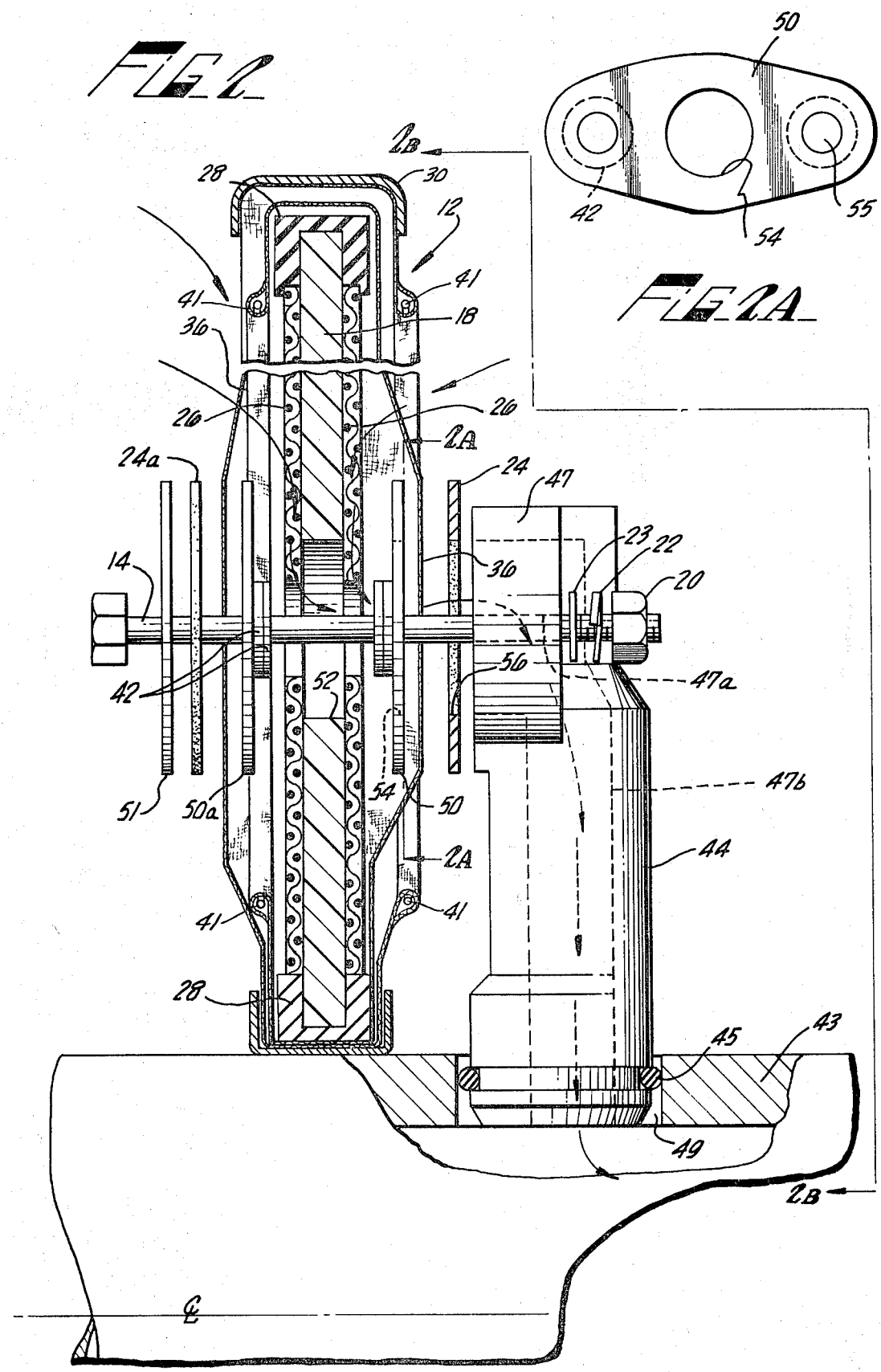

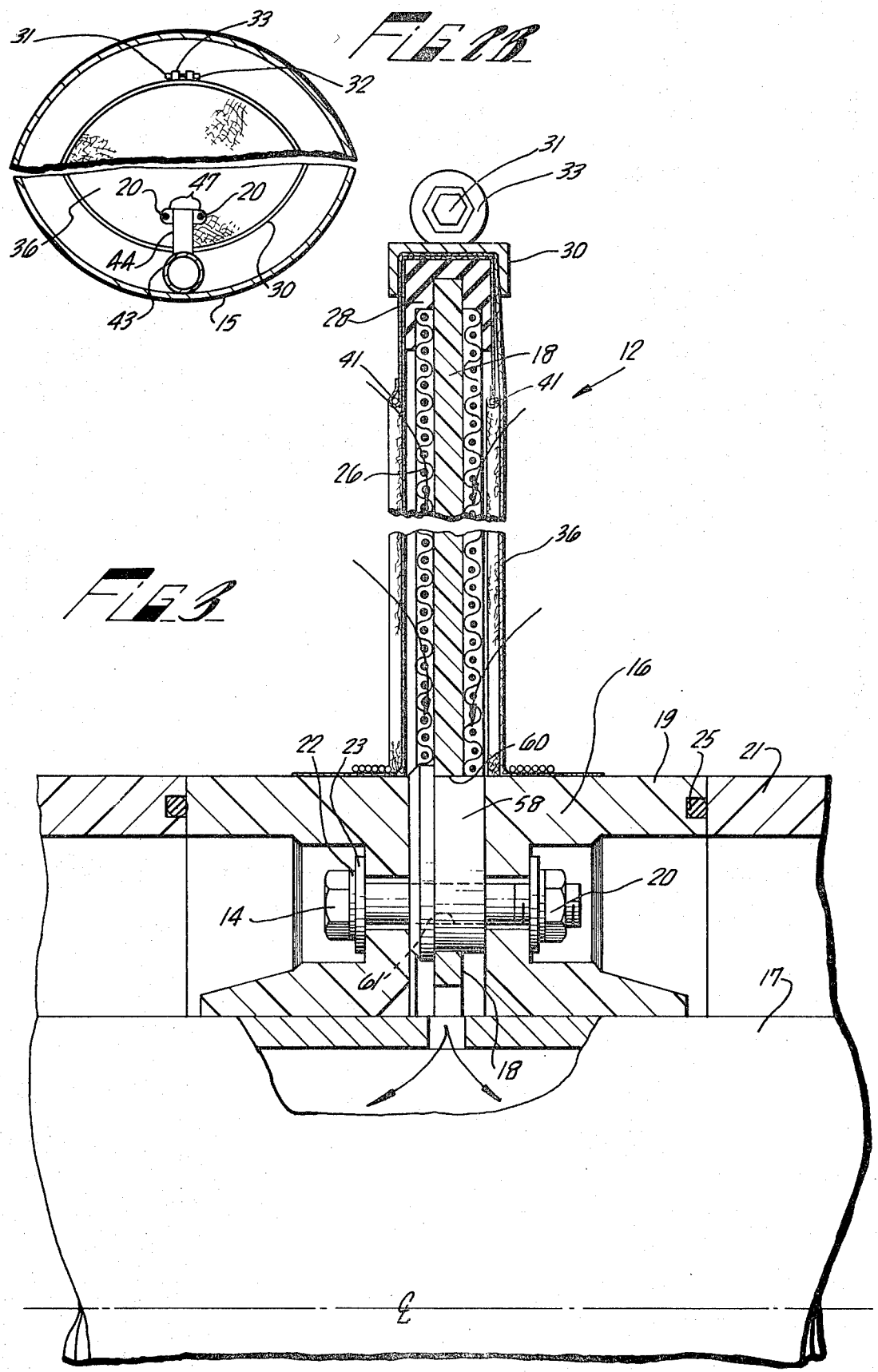

FILTER LEAF

BACKGROUND OF THE INVENTION

This invention relates to apparatus for the filtration of liquids under pressure, and more particularly to an improved filter leaf for use in such apparatus.

Filtration apparatus is of increasing industrial importance for the filtering of a wide variety of materials, such as water, oil, juices, syrups, and the like. Among the most effective of such apparatus is that having a cylindrical chamber in which the liquid to be filtered is delivered under pressure and forced through a plurality of filtering leaves mounted on a hollow shaft. Each filtering leaf communicates with the hollow portion of the shaft and delivers filtrate into the shaft for collection. The filter leaves are spaced apart in adjacent vertical planes along the hollow shaft. Conventional filter leaves have a screen or grid-type core element covered by a porous septum. The fluid to be filtered is forced against either side of the filter leaf to effect passage of fluid through the septum and down through the inner portion of each filter leaf into the hollow interior of the shaft. The filter leaves can be rotated on the hollow shaft to facilitate removal of the cake which accumulates on the filter leaves during the filtration process.

The filter leaf of conventional filtration apparatus comprises a metal core member usually consisting of a perforated metallic sheet or wire screen of sufficient rigidity to support the entire leaf structure. The core member also acts as a drainage channel to provide a path for the fluid entering the hollow outlet shaft. Intermediate backup screens are placed over the center screen to afford additional drainage passages and to give added support to the filter leaf. Fine mesh outer screens are secured over the intermediate backup screens to complete the leaf assembly. Alternately, a filtering cloth is sometimes used as the septum in place of the outer fine mesh screen.

Previously, it was considered essential to use an open work core in filter leaves to provide adequate drainage of the filtrate through the leaf. It has been found, however, that filter leaves having open work core members have failed to provide the durability required of filtration apparatus. Most significantly, metal screen or grid-type core elements have been unsatisfactory because they are disposed to wear, corrosion, and fatigue, and have failed to provide the required flexibility for withstanding high bridging pressures during the filtration process.

SUMMARY OF THE INVENTION

This invention provides an improved filter leaf for a liquid filtering apparatus in which fluid is directed against the sides of filter leaves mounted on a hollow shaft within the apparatus. The filter leaf of this invention has a solid backing plate, a drainage and support member, and a filtering member. The backing plate, which acts as a support for the drainage and support member and filtering cloth, is preferably a fiberglass disc. The drainage and support member, disposed on each side of the solid plate, is adapted for fluid communication with the hollow shaft. The drainage and support member can be any porous element capable of allowing the passage of filtrate edgewise through the filter leaf into the shaft. The outer filtering member can be any fine mesh wire, or suitable filtering cloth. Means are provided for sealing the filtering member to the periphery of the backing plate to define between the filtering member and each side of the backing plate a separate drainage channel for filtrate through each drainage and support member.

Use of a solid backing plate for supporting a drainage member and filtering covering has proved to be surprisingly effective in pressure filtering apparatus. Because of its construction, the filter leaf is characterized by greatly increased strength and resistance to deformation. As a result, the filtering apparatus can be used for significantly longer periods of time without requiring change or repair of the filter leaves. Furthermore, the increased durability is obtained without adversely affecting filtration capabilities. That is, the filtration rate is not decreased, and in most cases is considerably improved. Conventional filter leaves, such as those using coarse-mesh wire screens or grid-type core elements, fail to duplicate the durability or efficiency obtained from the filter leaves of this invention.

Filtration apparatus using the unique filter leaves of this invention produce a more advantageous flow path of the liquid to be filtered. When conventional filter leaves are used, liquid is passed through the filtering cover from each side of the leaf. The filtered liquid then passes down through the inner portion of the filter leaf into the hollow shaft. It is evident that uniform downward flow of the filtered liquid, employing such construction, is most advantageously accomplished when the flow from either side of the filtering leaf is approximately equal. The flow rate, however, is often dissimilar. When employing the filter leaf of this invention, the liquid to be filtered is forced under pressure through the filtering cover on each side of the filter leaf and brought into contact with the solid backing plate. The filtered fluid on each side of the filter leaf then passes into the hollow portion of the shaft, independent of the flow from the other side. This feature has proved to be extremely effective in assuring rapid drainage and filtration.

The filter leaves of this invention, which are preferably constructed of a plastic, such as fiberglass, exhibit numerous advantages over conventional wire mesh filter leaves. For example, filter leaves having fiberglass backing plates demonstrate increased resistance to electrolytic corrosion when compared with stainless steel or similar metallic filter leaves. Furthermore, filter leaves constructed of plastic have improved flow rates and can be more easily precoated. The plastic filter leaf has also been found to be significantly more elastic than conventional metallic filter leaves and can thereby withstand great bridging pressures without exceeding the elastic limit.

Although a variety of leaf filters have been employed in pressure filtering apparatus, including filter leaves having a center core element, intermediate drainage members, and a filtering cover, none of the conventional filter leaves employ a solid backing plate, as in accordance with this invention. Use of an open work inner structure in conventional filter leaves to obtain adequate drainage of the filtered liquid has proved completely unnecessary even for the most rapid filtration rates. Moreover, the solid construction of the filter leaves of this invention not only provides rapid filtration, but also makes possible a longlasting filter leaf, thereby lowering the cost of the filtration process.

BRIEF DESCRIPTION OF THE DRAWINGS

FIG. 1 is a fragmentary cross-sectional view of a filter leaf of this invention as used on a rotatable shaft;

FIG. 1A is a view taken on line 1A–1A of FIG. 1;

FIG. 2 is a fragmentary cross-sectional view of an alternate filter leaf of this invention on a stationary shaft;

FIG. 2A is a view taken on line 2A–2A of FIG. 2;

FIG. 2B is a view taken on line 2B–2B of FIG. 2; and

FIG. 3 is an alternate filter leaf on a rotatable shaft.

DESCRIPTION OF THE PREFERRED EMBODIMENTS

Referring to FIG. 1, a filter leaf 12 is secured by a bolt 14 to a hub 16 of a hollow rotatable shaft 17. The shaft and filter leaf are centrally disposed within a cylindrical filtration tank 15, as shown in FIG. 1A. The bolt extends from one side of the hub through an aperture 13 in a solid backing plate 18 of the filter leaf and through the opposing section of the hub, where it is secured by hex nuts 20. Washers 22, 23, and gaskets 24 are provided for assuring a firm and leak-proof seal. The solid backing plate 18 of the filter leaf is disc-shaped and preferably constructed of fiberglass or a similar flexible plastic material of high durability. The backing plate serves as the rigid foundation for the filter leaf and acts to absorb the torque exerted on the filter leaf by the rotation of shaft 17. A projecting rim 19 extends outward from the periphery of the hub 16 and abuts against a similar rim 21 projecting outward from the hub of an adjacent filter leaf. An O-ring 25 is seated in the extreme outer edge of rim 19 and makes a watertight seal against the extreme outer edge of rim 21.

A drainage member 26, consisting of a coarse-mesh plastic or metal screen, or the like, is disposed on each side of the solid backing plate and secured at its outer edge by a rubber seal strip 28. A flexible capping channel 30 fits around the outer periphery of the filter leaf and clamps together the components of the leaf after they have been assembled. The ends of the channel are joined together by a hex nut 31 and bolt 32 which extend through a pair of projecting members 33 located at the ends of the channel.

An outer filtering member is formed by a separate septum or filtering cloth 36 secured over the drainage member 26 on each side of the filter leaf and fastened at the center portion of the leaf between a respective flat plate 40 and gasket 24 on each side of the leaf. The septums overlap at the periphery of backing plate 18 and are drawn tightly against the face of each drainage member 26 by a respective draw string 41. The ends of capping channel 30 are then joined together to clamp the components of the leaf. Two flat washers 42 are disposed around the bolt 14 on each side of the solid backing plate 18. The washers serve as spacers to prevent the flat plates from crushing the drainage members when the components are assembled and to provide a drainage path for the filtered liquid entering the hollow shaft 17.

During operation of the filtration apparatus, liquid is directed against each side of the filter leaf, as indicated by the arrows, and is forced under pressure against the solid backing plate 18. The liquid then passes down through the drainage member 26 and into the interior of the hollow shaft 17. It is seen that the flow of filtered fluid from one side of the filter leaf is independent of the flow directed through the other side of the filter leaf, thereby assuring rapid and continuous filtration of the liquid.

FIG. 2 illustrates a filter leaf 12 of this invention mounted on a stationary shaft or outlet header 43. The header is an elongated hollow pipe mounted in the lower central portion of filter tank 15 and extending the length of the tank. A plurality of filter leaves are mounted in adjacent vertical planes on top of the header, as shown in FIG. 2B, and liquid is collected in the interior of the header after it is filtered. A hollow, upright, gooseneck nozzle 44 is mounted on top of header 43 adjacent the lower portion of the filter leaf. The upper portion of the nozzle is secured to the bottom center of the leaf by two bolts 14 which extend through the leaf and out through an aperture 47a in an ear 47 projecting outward from each side of the upper part of nozzle 44. Hex nuts 20 and washers 22, 23 secure the bolts to the nozzle. The nozzle conveys filtered liquid along a central channel 47b from the filter leaf to the interior of header 43 as indicated by the arrows in FIG. 2. An O-ring 45 seals the nozzle in a port 49 extending through the top of the header.

The filter leaf embodiment shown in FIG. 2 includes a drainage member 26 disposed on each side of a solid backing plate 18 and sealed at its outer edges by a rubber seal strip 28. Each filtering cloth or septum 36 is disposed around a respective side of the filter leaf, drawn tightly against the face of its respective drainage member 26 by draw string 41, and clamped and sealed around the periphery of the leaf by flexible channel 30. Bearing plates 50, 50a and backup plate 51, together with gaskets 24, 24a and bolts 14, secure the solid backing plate 18 to the nozzle 44 and seal the filtering cloth 36 in the nozzle area. The bolts also pass through a pair of flat washers 42 disposed on either side of the backing plate 18, for use as spacers to allow fluid flow into the nozzle. A large aperture 52 passes through the center of the backing plate 18, and communicates with an aperture 54 in bearing plate 50, and an aperture 56 in gasket 24 to provide a channel for fluid passing from the filter leaf into nozzle 44. The channel is illustrated more clearly in FIG. 2A which shows the bearing plate 50 with central aperture 54, bolt holes 55, and washers 42 on the opposite side of the plate.

During the filtration process, liquid to be filtered is directed against each side of the filter leaf. The liquid passes through the cloth cover and is directed under pressure against the backing plate so that it is forced down through the drainage member toward the hollow channel at the center of the backing plate. The filtered liquid passes out through the nozzle and into the stationary outlet header.

FIG. 3 shows a further alternative embodiment of the filter leaf 12 of this invention mounted on a rotary shaft 17 centrally disposed within a filtration tank. Each drainage member 26 comprises a porous back-up cloth disposed over a respective outer surface of backing plate 18 and sealed at its outer edge by a rubber seal strip 28. Each septum 36 is fastened around a respective side of the filter leaf, drawn tightly against the face of its respective drainage member 26 by draw strings 41, and clamped and sealed around the periphery of the leaf by the capping channel 30. A plastic spacer 58 comprising a solid cylindrical body with a circular flange at one end fits through an aperture 60 in the backing plate 18. The flange of the spacer abuts against the backing plate and provides a space between the plate and the hub 16 as shown in FIG. 3. The filter leaf is secured to the hub by the bolt 14 which extends through an eccentric hole 61 in the spacer, and through the opposite section of the hub 16, where it is secured by washers 22, 23, and hex nut 20. In the preferred form of the invention, there are eight spacers set in the backing plate at equally-spaced points around shaft 17. The spacers are arranged so that the flanges of adjacent spacers are on opposite sides of the backing plate. When the filter leaf components are assembled, the spacers provide a drainage channel for the filtered liquid entering the shaft from drainage member 26. Projecting rim 19 extends outward from the hub 16 and abuts against the rim 21 from an adjacent hub. O-ring 25 provides a leak-proof seal between rims 19 and 21.

A plurality of filter leaves, such as those described in FIGS. 1 and 3, are mounted vertically within the filter tank on a centrally disposed rotary shaft so that the maximum area of both sides of each leaf can be employed for filtering liquid within the tank. The filter leaves are typically set on standard 3-inch centers so as to permit greater filter cake buildup and longer filter cycles. Filter sizes ordinarily range from 10 to 1,000 square feet with flows up to 1,440,000 gallons per day in a single unit. Nozzles are disposed within the filter tank above the filter leaves for projecting a split spray of liquid against two screen surfaces simultaneously to effect over all cleaning with minimum sluice fluid. The shaft carrying the filter leaves is slowly rotated, usually at 3 r.p.m., so that the entire surface of the leaf comes into contact with the most effective arc of the spray, thus thoroughly cleaning the entire surface. Sludge can be quickly removed when formed at the bottom of the cylinder.

In the filtration apparatus shown in FIG. 2, filter leaves are mounted on a horizontal discharge header located at the bottom of the filter tank. The entire filter leaf assembly is removable from the tank for cleaning. Wet or dry filter cake can be cleaned from the leaves by hosing or scraping the leaves after they are withdrawn from the tank. A special vibration system can be used to discharge dry cake from the leaves.

The drainage member typically comprises a number of fine or coarse-mesh screens disposed on either side of the solid backing plate. The screens are bolted in place at the hub and are secured at the periphery by the capping channel. The drainage screens and outer cloths can be readily removed for replacement or repair.

The outer filtering cover or septum may be any fine mesh wire, cotton, vinyon, nylon, orlon, polypropylene, polyester, or any suitable filtering covering, and may be installed without costly factory rebuilding of the entire leaf. The leaf filter can be readily precoated, such as with asbestos fiber, diatomaceous earth, or the like, in accordance with any conventional precoating procedure.

The filter leaves of this invention can be used in any conventional filtration apparatus wherein filter leaves are disposed in adjacent vertical planes within a tank containing the liquid to be filtered. Any suitable filter tank can be employed, including fabricated and cast apparatus constructed of steel, stainless steel and similar metals, as well as those having surfaces lined with rubber or plastic.

I claim:

1. In a liquid filtering apparatus, wherein liquid to be filtered is forced under pressure against a plurality of filter leaves secured to a hollow shaft disposed within a chamber of the apparatus, such that filtrate is caused to flow into the hollow shaft from the filter leaves, an improved filter leaf comprising:
   a. a solid backing plate secured to the hollow shaft;
   b. a rigid, porous drainage and support member disposed on each side of the backing plate and adapted for fluid communication with the hollow shaft;
   c. a filtering member disposed over the periphery and both sides of the backing plate and over the drainage and support members; and
   d. means for sealing the filtering member to the periphery of the backing plate to define between the filtering member and each side of the backing plate a respective drainage channel through each drainage and support member for permitting filtrate in one channel to flow into the hollow shaft independently of the flow in the other drainage channel.

2. The improved filter leaf of claim 1 wherein the solid backing plate comprises a plastic disc.

3. The improved filter leaf of claim 2 wherein the drainage member comprises a coarse-mesh metal screen.

4. The improved filter leaf of claim 2 wherein the drainage member comprises a coarse-mesh plastic screen.

5. The improved filter leaf of claim 2 wherein the plastic disc is constructed of fiberglass.

6. The improved filter leaf of claim 1 additionally including a hub mounted on the hollow shaft on each side of the filter leaf, and a spacer on each side of the filter leaf in contact with both the solid backing plate and the end of the hub, the spacers providing means for allowing flow of filtrate from the drainage member into the hollow shaft.

7. The improved filter leaf of claim 6 wherein each spacer is in compression between its respective hub and the backing plate.

8. The improved filter leaf of claim 1 wherein the filtering member comprises a separate filtering cloth on each side of the backing plate, the filtering cloths being drawn tightly over the periphery of the backing plate so that they overlap for cooperation with the sealing means.

9. The improved filter leaf of claim 8 wherein each filtering cloth has a draw string for drawing the cloths tightly over the periphery of the backing plate.

10. The improved filter leaf of claim 1 wherein the sealing means comprises an edge seal cooperating between the outer edge of the backing plate and the filtering member, and means for clamping the filtering member to the edge seal.

11. The improved filter leaf of claim 10 wherein the edge seal comprises a U-shaped rubber seal strip fitted over the outer edge of the backing plate, the edge seal being configured and arranged to secure the outer edges of the drainage members to their respective sides of the backing plate.

12. The improved filter leaf of claim 10 wherein the clamping means comprises a flexible channel-shaped member disposed around the outer periphery of the backing plate for cooperation with the filtering member, and means for adjustably extending the channel-shaped member axially to clamp the filtering member around the periphery of the backing plate.